(No Model.)

A. M. HESS & S. MULHOLLAND.
HEATING AND COOKING ATTACHMENT FOR OIL, GAS, OR VAPOR STOVES.

No. 586,037. Patented July 6, 1897.

Witnesses. Inventors.

ated July 6, 1897.
UNITED STATES PATENT OFFICE.

ABBIE M. HESS AND SARAH MULHOLLAND, OF SAN FRANCISCO, CALIFORNIA.

HEATING AND COOKING ATTACHMENT FOR OIL, GAS, OR VAPOR STOVES.

SPECIFICATION forming part of Letters Patent No. 586,037, dated July 6, 1897.

Application filed March 1, 1897. Serial No. 625,664. (No model.)

*To all whom it may concern:*

Be it known that we, ABBIE M. HESS and SARAH MULHOLLAND, citizens of the United States, residing at San Francisco, in the county of San Francisco and State of California, have invented certain new and useful Improvements in Heating and Cooking Attachments for Oil, Gas, or Vapor Stoves; and we do hereby declare that the following is a full, clear, and exact description thereof.

Our invention relates to an attachment to gas, oil, or vapor stoves, the object of which is to increase the cooking capacity of the burners for a single hole, as well as to utilize to a greater extent than is now possible the heating power of the said burners. In ordinary stoves burning gas or oil the cooking capacity of a single burner is limited to a single utensil at a time. We have devised an attachment for such burners in which different kinds of cooking in a variety of utensils can be carried on simultaneously partly within and partly upon the attachment.

Figure 1:
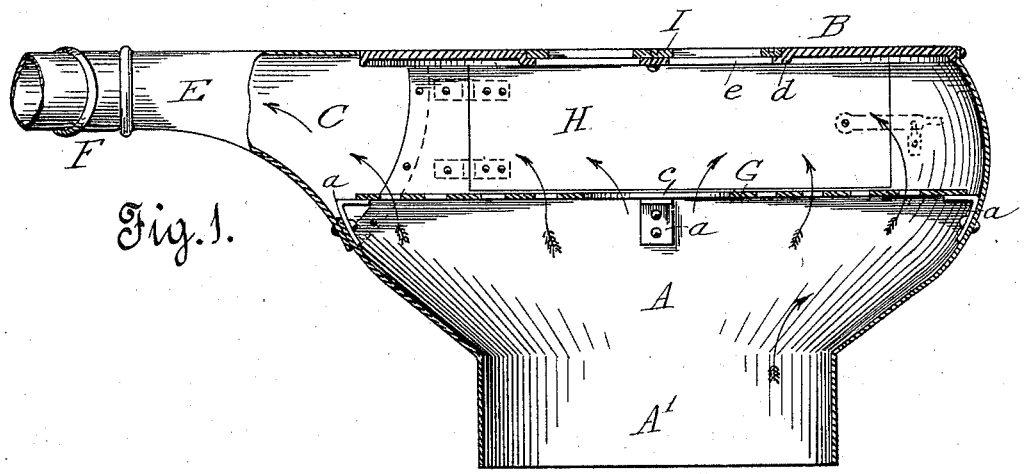
Figure 2:
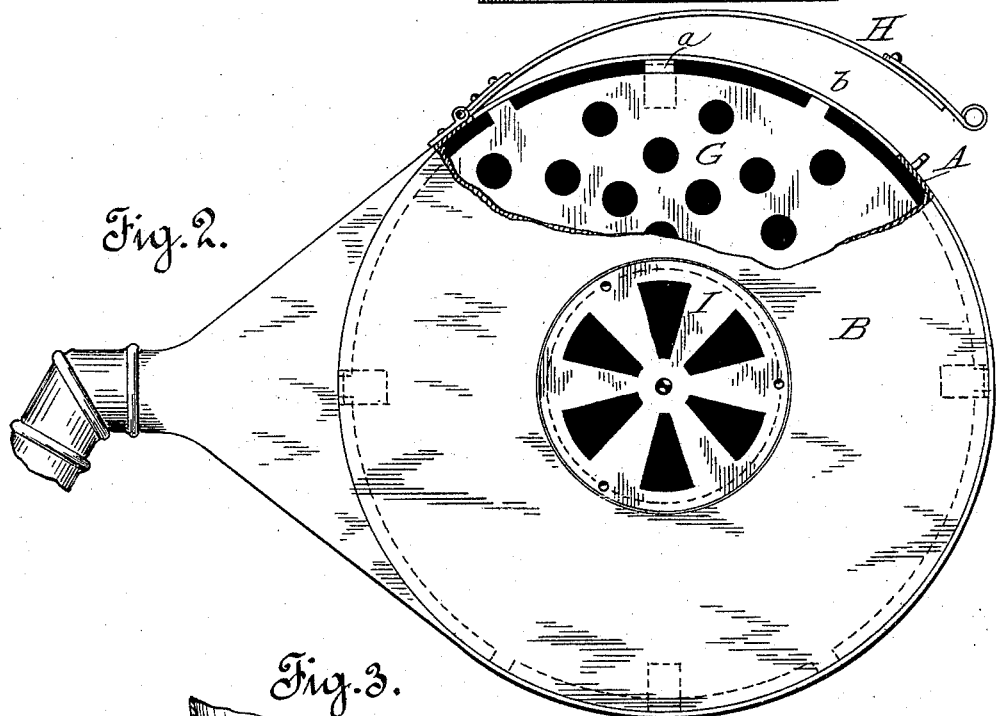
Figure 3:
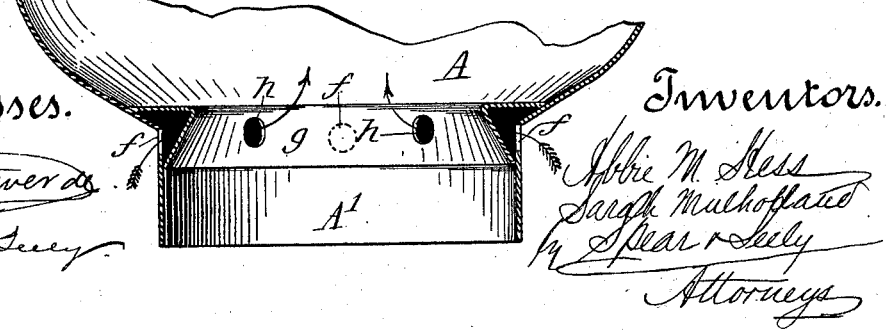

In the accompanying drawings, Figure 1 is a central vertical section. Fig. 2 is a plan view. Fig. 3 is a detail section of the base of the attachment, showing a slight modification for use with gasolene-burners.

A represents a vessel or chamber preferably made of sheet metal and of generally circular shape in any horizontal section. This vessel is provided with a base flange or collar A', which fits over the burner or the hole of the stove and may be secured in any suitable manner. The outline of a vertical section of the vessel is substantially that of a section of a globe that is flaring outwardly from the collar A' and then curving inwardly to meet the flat top plate B. It is intended that the interior of the vessel shall be free from corners or angles in order to secure a perfect distribution of heat in the interior. At one side of the chamber is a heating-space C, communicating with the interior and preferably formed from a separate funnel-shaped sheet-metal extension D, having a flat top which coincides with the plate B and a curved bottom which continues the curve of the chamber A, as shown in Fig. 1. This extension terminates in a tubular portion E, adapted to receive the adjustable and removable heating-pipe F, which is designed to convey heat to any part of a room. When the heating-pipe is removed, the tube E can be closed by any suitable end cap. The flat top of the heating-space C forms a convenient receptacle for warming plates or for keeping cooked food warm.

Within the chamber or oven A are a number of lugs $a$, upon which is set the perforated shelf G. This shelf is provided with a number of projections $b$, which center it in place and leave a hot-air passage extending around its edge, so that no eddy of hot air is formed at a corner, as would be produced did the edge of the shelf bear upon the wall of the oven. A comparatively large central opening $c$ is formed in the shelf through which the heat passes directly upward from the burner.

H represents the oven-door.

The top plate B is preferably, although not necessarily, a thin casting riveted to the body of the oven and having a central depressed flange $d$ and a number of radial openings $e$. A circular register I is countersunk in this depression so as to lie perfectly flush with the surface of the plate B. When this register is open, a cooking utensil placed upon it receives a large amount of heat passing through the central opening of the shelf. When baking or roasting alone or when heating a special part of the room, this register can be closed; but when open cooking of any kind can be carried on in utensils placed upon the top plate. Thus, for instance, both baking and boiling can be going on at the same time upon a single-hole oil or gas stove. The register being flush with the top plate and without external ribs or projections, the cooking vessel rests directly upon the register without any intervening space through which cool air can circulate and act as a partial insulator against heat.

The device shown in Fig. 3 contains a slight modification intended for use more particularly with gasolene-stoves, in which the collar fits tightly above the burner, so that it is necessary to supply some air. In such cases we provide air-inlets $f$ around the collar, and in order to prevent comparatively cool air from entering the oven directly a piece of sheet metal is bent into angular form and supported opposite these openings. This forms a flue $g$, in which the air is heated, the openings $h$, through which such air passes to the oven, being placed out of line or alternating with the holes $f$, so that the air is compelled to pass through a portion of the hot flue before it can escape.

The principal advantage of our device lies in the increased cooking capacity which it gives to single-hole oil or gas stoves, enabling separate kinds of cooking to be carried on at once with perfect success, as has been practically demonstrated. As a heating device, it is also far more effective than the ordinary burner, partly because the large surface of the chamber A is an effective radiator, but also because by attaching an adjustable pipe of any length to the side extension heat can be conducted to any part of a room. The device can be made as a separate article of manufacture and then attached permanently to a stove, or can be made to be removable, as may be preferred. A further advantage of our device consists in the fact that the odors commonly noticed in oil-stoves are entirely destroyed in the heated chamber, as is made evident by the fact that in practice no deposit of oily matter is found upon the interior of the oven, nor does food cooked within such oven show any traces of its proximity to ill-smelling oily vapor.

A further advantage lies in the safety afforded any adjacent inflammable articles by the fact that the flame is confined. This is particularly the case when the device is used with so-called "blue-flame" stoves, which are liable to sudden bursts of flame, by which many serious fires have been started.

Having thus described our invention, what we claim as new, and desire to secure by Letters Patent, is—

1. A heating and cooking attachment for oil, gas or vapor stoves, consisting of a chamber adapted to be placed above the burner, and having a flat top plate provided with a register, and a perforated shelf within said chamber having an enlarged central opening in line with said register.

2. A heating and cooking attachment for oil, gas or vapor stoves, comprising a chamber of circular horizontal cross-section and of curvilinear vertical cross-section, having a flat top provided with a register, and an interior perforated shelf having a large central opening in line with said register.

3. A heating and cooking attachment for oil, gas or vapor stoves comprising in combination, a chamber or oven, of curvilinear outline both in plan view and elevation, and having a flat top provided with a countersunk register, a perforated shelf within said chamber, of less diameter than the same, and having a central opening in line with said register and an extension of the chamber having a coinciding flat top and provided with a heat-outlet adapted to receive a pipe.

In testimony whereof we have affixed our signatures, in presence of two witnesses, this 16th day of February, 1897.

ABBIE M. HESS.
   SARAH MULHOLLAND.

Witnesses:
 L. W. SEELY,
 F. H. SEELY.